United States Patent
McIntosh et al.

(10) Patent No.: US 7,649,325 B2
(45) Date of Patent: Jan. 19, 2010

(54) METHODS AND APPARATUS FOR SWITCHING REGULATOR CONTROL

(75) Inventors: James A. McIntosh, East Lothian (GB); Aldo Togneri, Roslin Midlothian (GB); Robert D. Christie, Fife (GB)

(73) Assignee: Allegro Microsystems, Inc., Worcester, MA (US)

( * ) Notice: Subject to any disclaimer, the term of this patent is extended or adjusted under 35 U.S.C. 154(b) by 383 days.

(21) Appl. No.: 11/396,566

(22) Filed: Apr. 3, 2006

(65) Prior Publication Data

US 2007/0229001 A1 Oct. 4, 2007

(51) Int. Cl.
*H05B 41/36* (2006.01)
(52) U.S. Cl. .................................. 315/291; 315/224
(58) Field of Classification Search ................. 315/291, 315/306–308, 192, 224; 323/222, 272, 282–284; 340/815.45
See application file for complete search history.

(56) References Cited

U.S. PATENT DOCUMENTS

| | | | |
|---|---|---|---|
| 5,204,639 A | 4/1993 | Moore et al. | |
| 5,414,341 A | 5/1995 | Brown | |
| 5,481,178 A | 1/1996 | Wilcox et al. | |
| 5,600,234 A | 2/1997 | Hastings et al. | |
| 5,731,694 A | 3/1998 | Wilcox et al. | |
| 5,994,885 A | 11/1999 | Wilcox et al. | |
| 6,011,431 A | 1/2000 | Gilbert | |
| 6,072,339 A * | 6/2000 | Bertolini | 327/54 |
| 6,100,678 A | 8/2000 | Hobrecht | |
| 6,144,194 A | 11/2000 | Varga | |
| 6,208,279 B1 | 3/2001 | Oprescu | |
| 6,285,246 B1 | 9/2001 | Basu | |
| 6,304,066 B1 | 10/2001 | Wilcox et al. | |
| 6,307,356 B1 | 10/2001 | Dwelley | |
| 6,424,129 B1 | 7/2002 | Lethellier | |
| 6,518,733 B1 | 2/2003 | Schenkel et al. | |

(Continued)

FOREIGN PATENT DOCUMENTS

WO   WO 2005/031956   4/2005

OTHER PUBLICATIONS

Chris Richardson, Driving High Brightness LEDs With Switching Regulators, Mar. 21, 2006, pp. 1-14.

(Continued)

*Primary Examiner*—Bao Q. Vu
*Assistant Examiner*—Jue Zhang
(74) *Attorney, Agent, or Firm*—Daly, Crowley, Mofford & Durkee, LLP

(57) ABSTRACT

A circuit includes a capacitive element for coupling across a load element to be energized by a DC signal, a first sense element to monitor an instantaneous sum of currents through the load element and the capacitive element, a switching element to control current through the first sense element, a second sense element coupled to the switching element to sense current through the switching element, an energy storage element coupled to the switching element, a unidirectional current flow element allowing current flow to the load element, and a converter circuit to control the switching element, wherein the converter circuit regulates to the current level monitored across the first sense element, and wherein a converter regulation loop includes a dominant pole to average the current sensed through the first sense element.

22 Claims, 5 Drawing Sheets

U.S. PATENT DOCUMENTS

| | | | |
|---|---|---|---|
| 6,580,258 | B2 | 6/2003 | Wilcox et al. |
| 6,674,274 | B2 | 1/2004 | Hobrecht et al. |
| 6,952,093 | B1 | 10/2005 | Broach et al. |
| 7,233,258 | B1 * | 6/2007 | Gelinas ............... 340/907 |
| 2005/0110469 | A1 | 5/2005 | Inaba et al. |
| 2008/0030178 | A1 | 2/2008 | Leonard et al. |

OTHER PUBLICATIONS

National Semiconductor, LED Lighting Management Solutions, Fall, 2005, pp. 1-16.

Alx, Var, Melexis Microelectronic Integrated Systems, IC Specification MLX10803 Automotive High Power LED Driver, Sep. 28, 2005, pp. 1-25.

Semtech, SC104 Micro Power Constant-Current DC-DC Converter, Mar. 22, 2005, pp. 1-12.

Sipex, High Efficiency Charge Pump Regulator for White LEDs, Mar. 4, 2005, pp. 1-12.

Toko, Inc., Step Up DC-DC Converter IC TK11850L, Mar. 2002, pp. 1-24.

MPS Monolithic Power Systems, MP1521 High Efficiency White LED Driver, Feb. 26, 2003, pp. 1-4.

Micrel, MIC2287, 1.2MHz PWM White LED Driver with OVP in 2mm×2mm MLFtm and Thin SOT-23, Jul. 2005, pp. 1-10.

Micrel, MIC2142 Micropower Boost Converter Preliminary Information, Dec. 2000, pp. 1-17.

Microsemi, High Efficiency LED Driver, 2000, pp. 1-11.

National Semiconductor Corporation, LM3501 Synchoronous Step-up DC/DC Converter for White LED Applications, May 2005, pp. 1-18.

Maxim, High-Efficiency Step-Up Converters for White LED Main and Subdisplay Backlighting, Aug. 2005, pp. 1-10.

Maxim, High-Efficiency Step-Up Current Regulator for LEDs, Aug. 2005, pp. 1-8.

Maxim, High-Efficiency, 32V Step-Up Converters with TA Derating Option for 2 to 8 White LEDs, Aug. 2005, pp. 1-8.

Linear Technology, LT1618 Constant-Current/Constant-Voltage 1.4 MHz Step-Up DC/DC Converter, 2001, pp. 1-16.

Linear Technology, White LED Driver in Tiny SC70 Package Delivers High Efficiency and Uniform LED Brightness—Design Note 315, 2003, pp. 1-2.

Steven Martin, LTC3202 Charge Pump Improves Efficiency for Powering White LEDs, Sep. 2001, pp. 31, 33.

Allegro Microsystems, Inc., A8483 1.2 MHz Step-up Converter for Display Bias Supply, 2005, pp. 1-9.

Allegro Microsystems, Inc., White LED Driver Constant Current Step-Up Converter, 2005, pp. 1-10.

Supertex, Inc., Hysteretic Boost-Buck (Cuk) LED Driver ICs, 2005, pp. 1-7.

Supertex, Inc., Boost Converter LED Drivers Using Supertex's HV9911, 2005, pp. 1-17.

Supertex, Inc., Switch-Mode LED Driver IC with High Current Accuracy, 2005, pp. 1-9.

Notification of Transmittal of the International Search Report and The Written Opinion of the International Searching Authority, or the Declaration dated Jan. 10, 2008; International Application No. PCT/US2007/006875.

* cited by examiner

METHODS AND APPARATUS FOR SWITCHING REGULATOR CONTROL

CROSS REFERENCE TO RELATED APPLICATIONS

Not Applicable.

STATEMENT REGARDING FEDERALLY SPONSORED RESEARCH

Not Applicable.

BACKGROUND

As is known in the art, converter devices can provide a regulated DC (direct current) output signal to energize a load. Such converters have a wide range of applications. One such application is for energizing LEDs (light emitting diodes). In known configurations, load components, such as capacitors, can interfere with the stability of a feedback compensation loop since the capacitor will introduce additional poles and zeroes. Particularly for high current applications, this can limit the size and type of capacitor that can be used and thereby limit the switching response of the circuit.

SUMMARY

The present invention provides a converter circuit having load current filtering that is independent of a regulation loop. With this arrangement, a load capacitor, for example, does not interfere with loop stability to allow greater flexibility in selecting the capacitor. While the present invention is primarily shown and described in conjunction with a converter to regulate current through a high current LED stack, it is understood that the invention is applicable to loads in general for which it is desirable to regulate current.

In one aspect of the invention, a converter circuit includes switch current terminals to receive current information for current through a switching element, and output current terminals to receive current information for the sum of the current through the load and the output capacitance. An inner loop is coupled to the switch current terminals to control an average inductor current by a peak switch current on a cycle-by-cycle basis, and an outer loop is coupled to the output current terminals to compare the output current to a reference current and generate and error signal to set an average amount of energy required by the load.

In another aspect of the invention, a circuit includes an LED stack, a capacitor coupled across the LED stack, and a first current sensing resistor coupled in series with the LED stack and capacitor to detect the instantaneous sum of the currents through the LED stack and the capacitor. The circuit further includes a blocking diode with the cathode coupled to the LED stack and capacitor and an inductor with the first end coupled to the anode of the blocking diode and the second end coupled to an input voltage signal. A switching element is coupled to the inductor and blocking diode anode, wherein the switching element controls the current through the first current sensing resistor. A second current sensing resistor is coupled to the switching element; and with a converter circuit to control the switching element, wherein the converter regulates to the current level monitored across the first current sensing resistor.

The circuit can further include one or more of the following features: a sixth terminal to receive a modulation signal; a seventh terminal to receive a current level selection signal; and an outer loop coupled to the first and second terminals and an inner loop coupled to the third and fourth terminals.

BRIEF DESCRIPTION OF THE DRAWINGS

The exemplary embodiments contained herein will be more fully understood from the following detailed description taken in conjunction with the accompanying drawings, in which.

DETAILED DESCRIPTION

Figure 1:
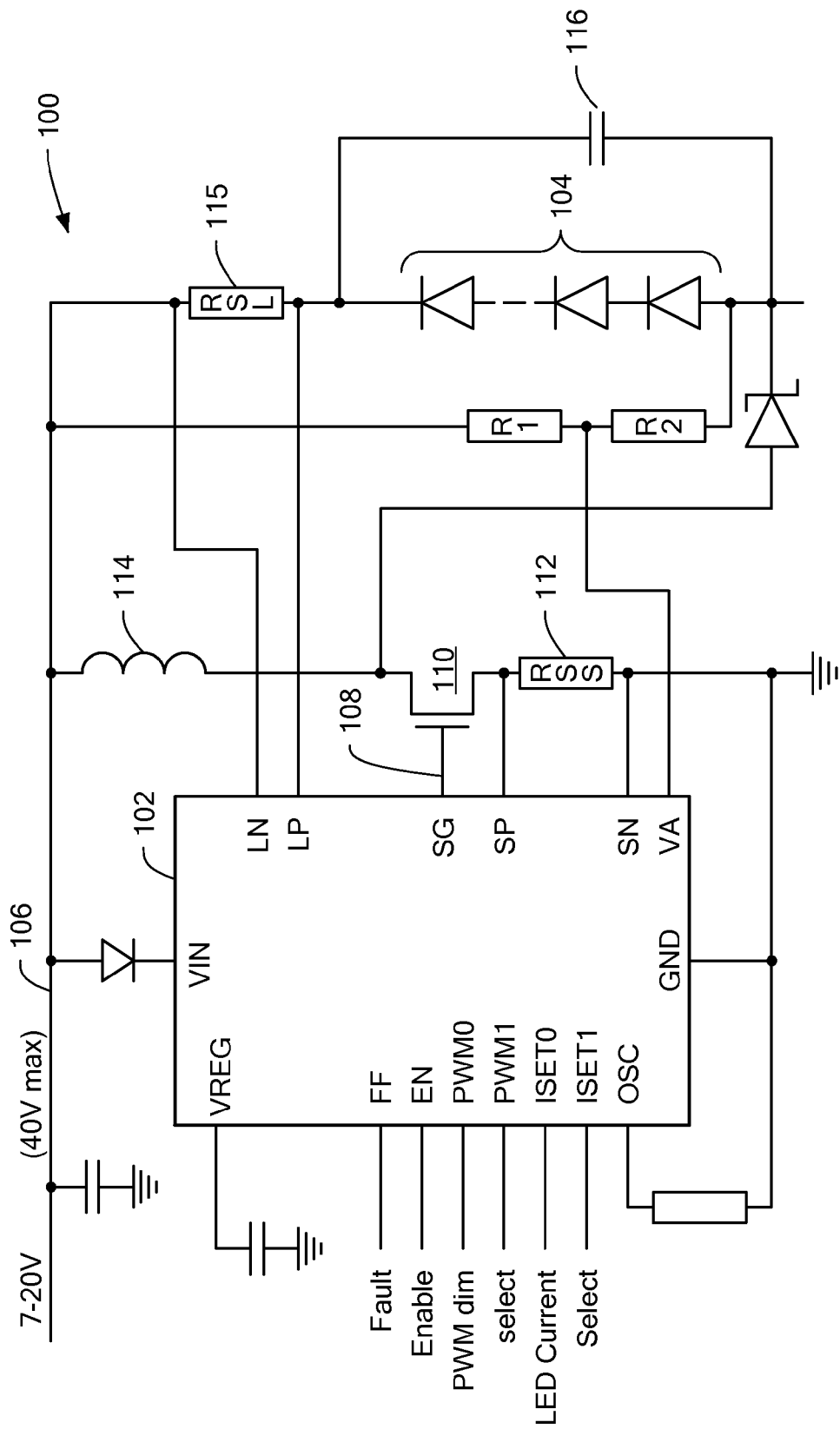
FIG. 1 is a block diagram of an exemplary circuit having a converter in accordance with exemplary embodiments of the invention.

FIG. 1 shows an exemplary circuit 100 having a converter 102 driving an LED stack 104. The converter 102 receives an input voltage signal 106 to a voltage input terminal VIN and provides a gate drive signal 108 on an output terminal SG coupled to a switching device 110, such as a Field Effect Transistor (FET). An inductor 114 is coupled between the voltage input terminal VIN and the switching device 110 with a current limit sense resistor (RSS) 112 coupled between the switching device 110 and ground. A LED current sense resistor (RSL) 115 is coupled between the LED stack 104 and the voltage input terminal VIN. A load capacitor 116 is coupled across the LED stack 104.

In the illustrated embodiment, first and second pulse width modulation (PWM) inputs PWM0, PWM1 provide a mechanism to select a PWM dimming level for the LEDs 104. First and second current select inputs ISET0, ISET1 allow a current level to be selected, as described more fully below. In other embodiments, more and fewer modulation and/or current level inputs are provided to meet the needs of a particular application.

First and second LED current input terminals LN, LP are coupled across the LED current sense resistor (RSL) 115 to provide LED current information to the converter. First and second switch current input terminals SP, SN are coupled across the sense resistor (RSS) 112 to provide switch current information. An LED voltage input terminal VA is coupled to an anode of the LED stack 104 to provide LED voltage information via a resistor network comprising first and second resistors R1, R2. This enables the output voltage to be limited to a predetermined level, such as 50V.

TABLE 1

| Converter I/O | | |
|---|---|---|
| Pin | Pin Name | Pin Description |
| 1 | FSEL | Frequency compensation select |
| 2 | ISET1 | Set load current bit 1 |
| 3 | ISET0 | Set load current bit 0 |
| 4 | PWM1 | Set PWM dimming bit 1 |
| 5 | PWM0 | Set PWM dimming bit 0 |
| 6 | OSC | Oscillator frequency set |
| 7 | EN | Chip enable |

TABLE 1-continued

Converter I/O

| Pin | Pin Name | Pin Description |
|---|---|---|
| 8 | FF | Fault flag |
| 9 | SN | Switch current sense −ve input |
| 10 | SP | Switch current sense +ve input |
| 11 | SG | Switch gate drive |
| 12 | N.C. | Connect to 0 V |
| 13 | GND | Ground |
| 14 | VREG | Internal regulator capacitor |
| 15 | N.C. | Connect to 5 V |
| 16 | VIN | Main supply |
| 17 | LP | Load current sense +ve input |
| 18 | LN | Load current sense −ve input |
| 19 | N.C. | Not connected |
| 20 | VA | Voltage limit feedback input |

The converter 102, which can be referred to as a buck-boost DC-DC converter in an exemplary embodiment, provides a programmable constant current output at up to 50V, for example, for driving high power LEDs 104 in series. Driving the LEDs 104 in series ensures identical currents and uniform brightness. For automotive applications, for example, optimum performance is achieved when driving between two and ten LEDs at currents up to 1 A. In one embodiment, a constant frequency, current mode control scheme is used to regulate the current through the LEDs 104.

In an exemplary embodiment, the LEDs 104 are so-called high current LEDs that can draw for example, a maximum of 1 A. Such LEDs can be used for various applications, such as vehicle headlamps. With the high current levels, conventional converters may provide inadequate switching characteristics. Unlike known implementations, the inventive embodiments do not require complex compensation networks that are load dependent. While topologies with comparable response times maybe possible for PWM dimming, such topologies require the user to compensate for the output load pole and zero introduced by an output capacitor.

While the invention is primary described in conjunction with LED applications, it is understood that the invention is applicable to any type of load. In addition, while exemplary embodiments show a load capacitor across the LED stack, it is understood that alternative embodiments include additional impedance components and can have a variety of circuit configurations. Further, while illustrative embodiments show pulse width modulation to control current, it is understood that other modulation techniques, such as frequency modulation, can be used without departing from embodiments of the invention. While so-called high power LEDS are referred to having current ratings in the order of 1 A, it is understood that the invention is applicable to loads having any current rating. It is understood that high current LEDs refer to present day standards with the expectation that current ratings will increase in the future. It is contemplated that the inventive embodiments will be applicable to these devices without departing from the invention.

Figure 2:
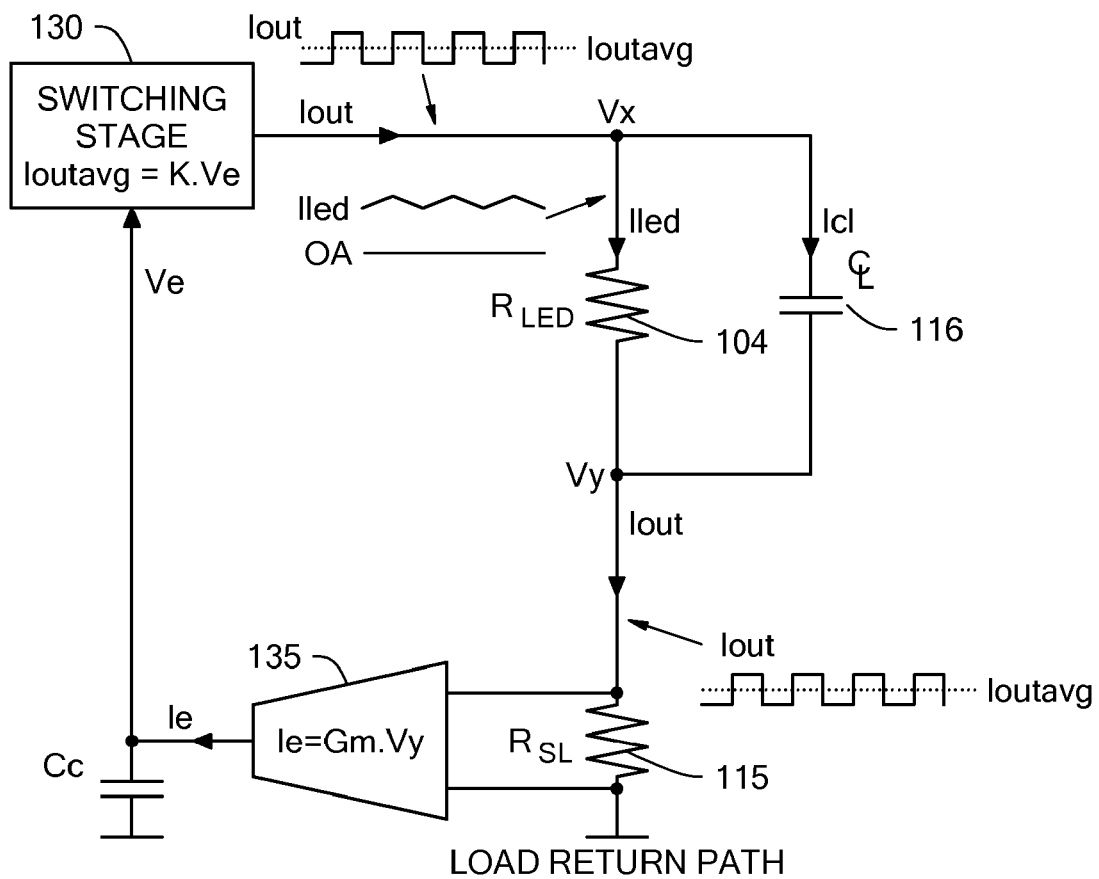
FIG. 2 is a block diagram of a circuit having an open loop response in accordance with an exemplary embodiment.

As shown in FIG. 2 in conjunction with FIG. 1, in the illustrated switch-mode current regulating configuration the load capacitor 116 does not interfere with the stability of the compensation loop. The illustrated circuit 100 has one terminal of the current sense device (RSL) 115 on the node connecting the capacitor 116 and LED stack 104 together and the other current sense device terminal to the current return path.

This arrangement removes the effect of the output capacitor 116 on the loop stability. The current sense device (RSL) 115 provides an unfiltered feedback signal that is proportional to the current being output by the switching stage 130, the average of which is equal to the load current. With this arrangement, the output load and ripple filter capacitor 116 (and equivalent series resistance (ESR) of the capacitor) have no effect on the system stability therefore allowing the user greater flexibility in setting the load resistance and filter capacitance.

As shown, the output current from the switching stage 130 is a square wave and a current through the LED stack 104 has some degree of ripple. The current across the sense resistor RSL is a square wave. Since the load capacitor 116 is coupled across the LED stack, 104, the open loop response of the circuit in the frequency domain (Laplace transform variable s) is $$K \times RSL \times Gm\left(\frac{1}{sCc}\right),$$

where K is a constant, RSL is the resistance of the sense resistor, Cc is the capacitance of the capacitor Cc, and Gm is the transconductance of the amplifier 135. The amplifier 135 outputs a current error signal Ie corresponding to a voltage Vyacross the sense resistor RSL multiplied by a gain value Gm. Capacitor Cc represents the capacitance of the integrator stage of the feedback loop (see outer loop 250 and AE 256 of FIG. 3 below) with an error voltage signal Ve being provided to the switching stage 130.

Figure 2A:
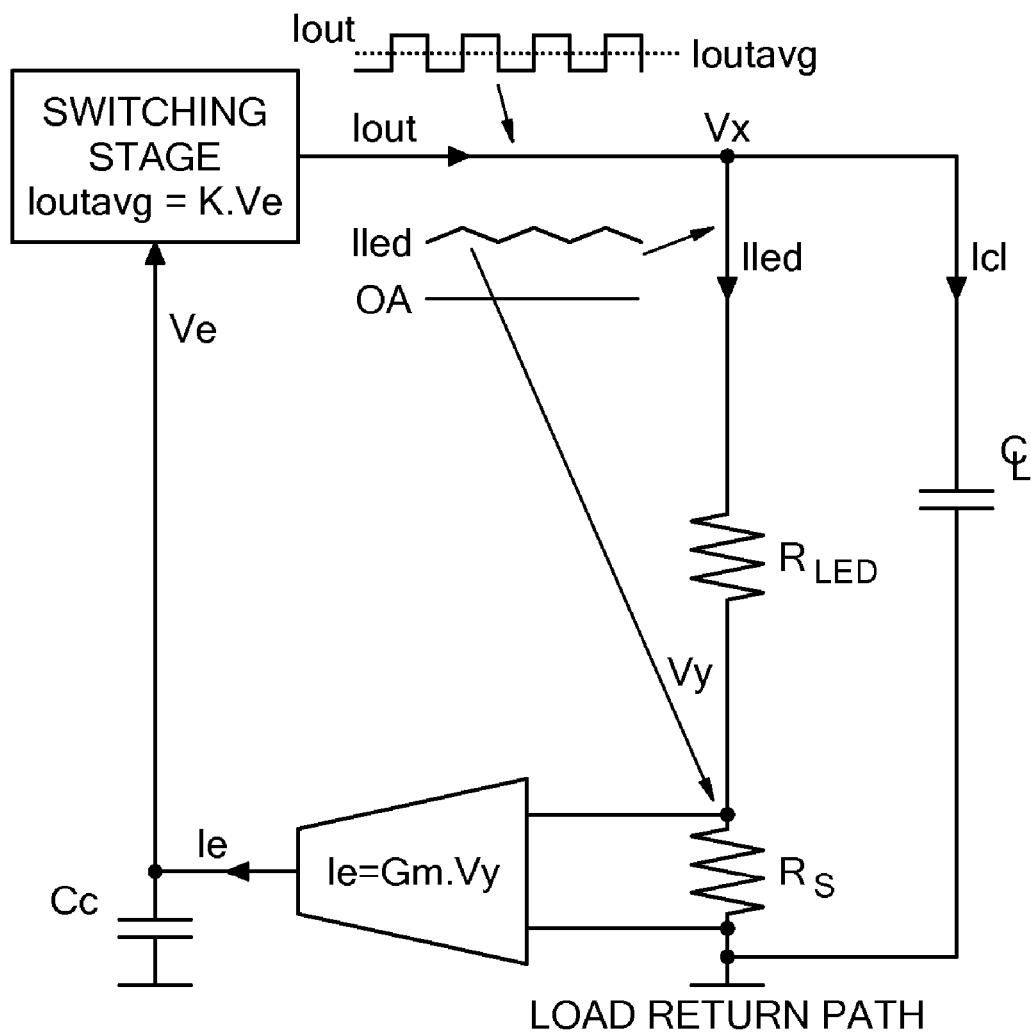
FIG. 2A is a block diagram showing a circuit having an open loop response of greater complexity than the circuit of FIG. 2.

In contrast, as shown in the configuration of FIG. 2A, where a load capacitor is coupled across the LED stack and sense resistor the current though sense resistor Rs is not a square wave and the open loop response is $$K \times Rs\left(\frac{1}{1 + s(Rs + Rled)C_L}\right) \times Gm\left(\frac{1}{sCc}\right).$$

As can be seen, in this configuration the load capacitor $C_L$ complicates the loop response by introducing another pole as compared to the arrangement of FIG. 2.

Figure 2B:
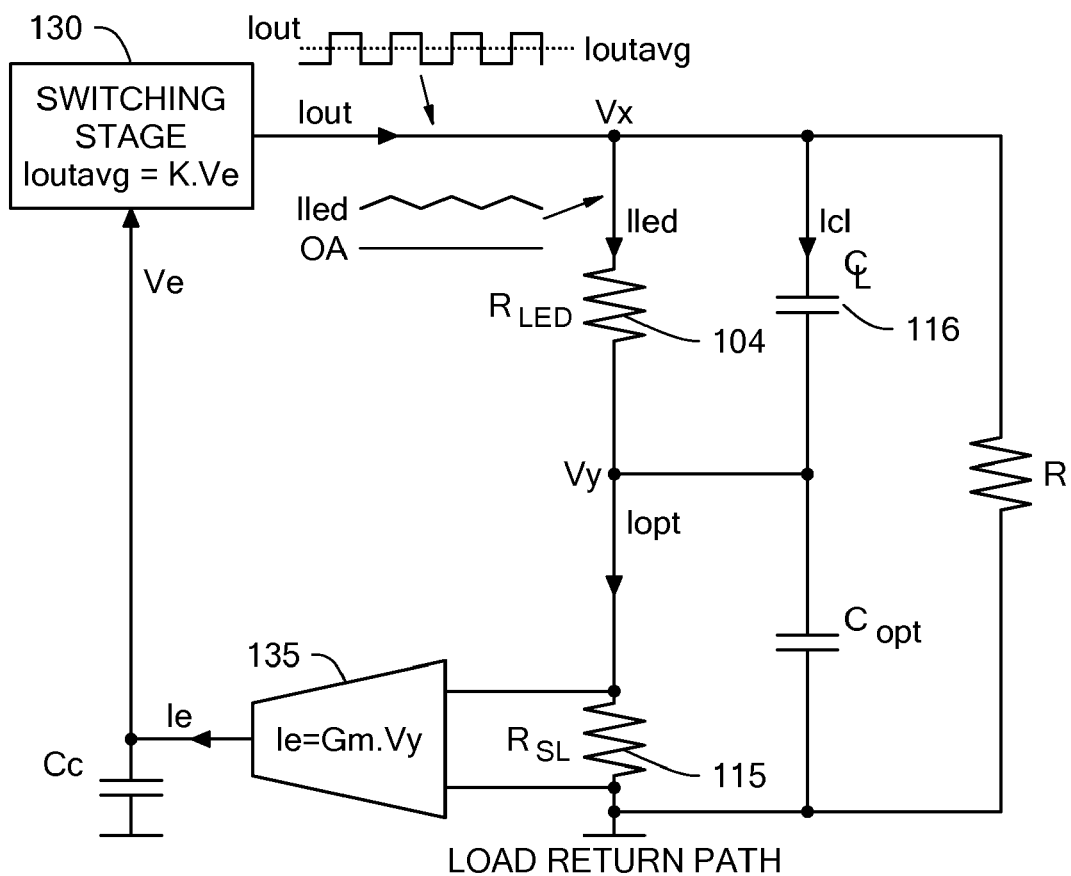
FIG. 2B is a block diagram of an alternative embodiment of the circuit of FIG. 2.

FIG. 2B shows an alternative embodiment of the circuit of FIG. 2, where like reference numbers indicate like elements. The circuit further includes a resistor R coupled across the series-coupled LED stack 104 and sense resistor RSL 115. A capacitor Copt is coupled across the sense resistor RSL to remove the high frequency edges from the voltage waveform across the sense resistor. The resistor R is intended to show that an extra load can be tapped from the switching stage 130. That is, current through the sense resistor RSL may not be equal to the current output of the switching element.

High-powered LEDs can be run at average currents that are close to the absolute maximum current rating of the LEDs. As is known in the art, the chromaticity of some LEDs is sensitive to the average current. The inventive method and apparatus embodiments allow the user to trade-off LED current ripple against load capacitor size and cost without being concerned about interfering with the loop stability. Minimizing the effect of the output load on the stability provides a more predictable and therefore higher GBW (gain-bandwidth product) to be set by the dominant pole, thus allowing faster system response to power supply disturbances and other unwanted transients.

Figure 3:
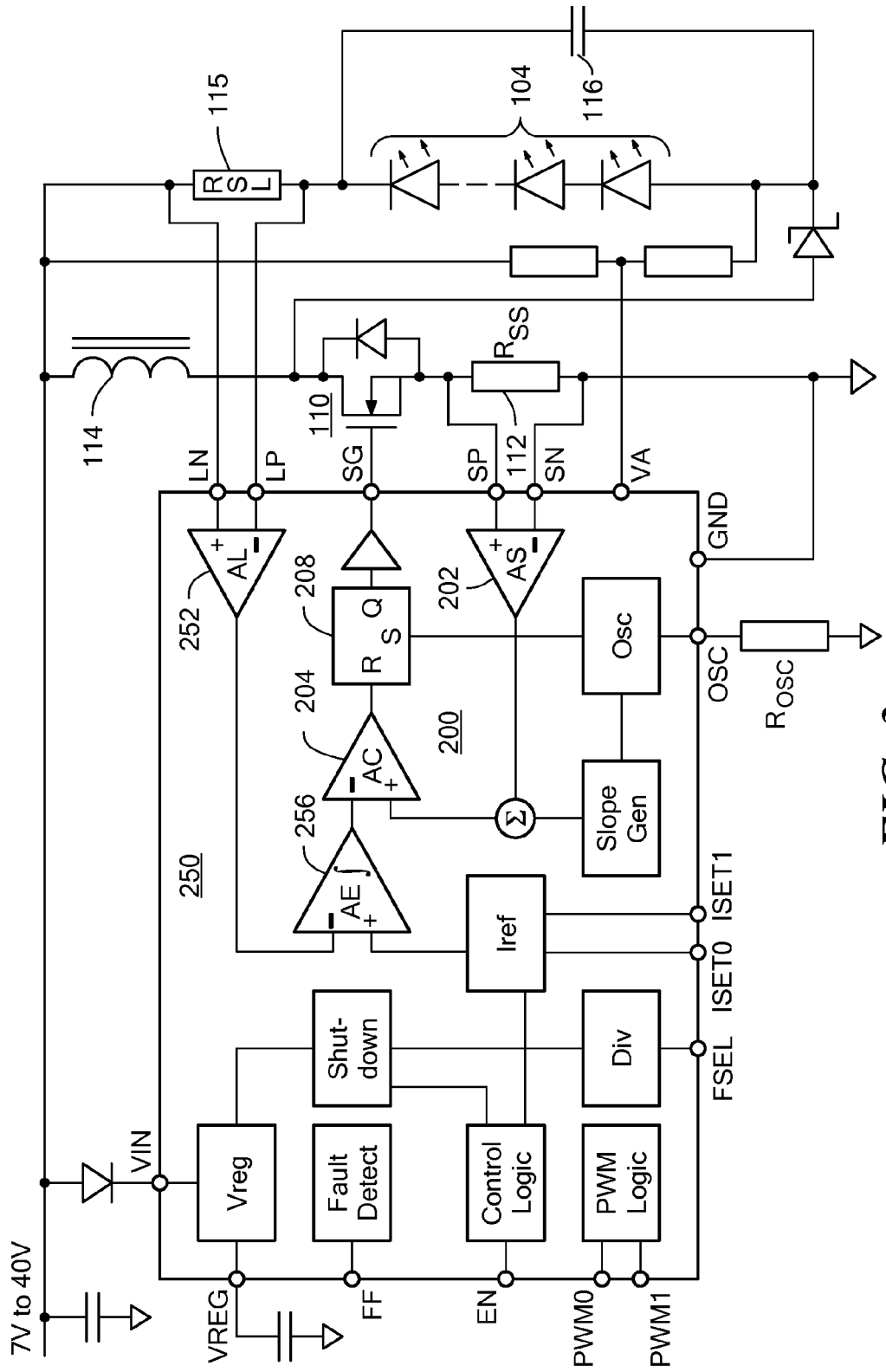
FIG. 3 is a block diagram showing an exemplary implementation of the converter of FIG. 1.

FIG. 3 shows an exemplary implementation of the converter 102 of FIG. 1, where like reference numbers indicate like elements. The converter 102 includes an inner loop 200 that includes an amplifier (AS) 202, comparator (AC) 204, and RS bistable latch 208, to control the inductor current as measured through the switch 110 by the switch sense resistor (RSS) 112. The converter 102 further includes an outer loop 250 having an amplifier (AL) 252 and an integrating error amplifier (AE) 256 to control the average LED current by providing a set point reference for the inner loop 200.

The LED 104 current is measured by the LED sense resistor (RSL) 115 and compared to a reference current, which is selected by signals to the current level select inputs ISET0, ISET1, to produce an integrated error signal at the output of error amplifier AE 256. This error signal sets the average amount of energy required from the inductor 114 by the LEDs. The average inductor energy transferred to the LEDs is defined by the average inductor current as determined by the inner control loop 200.

In an exemplary embodiment, the LED current is determined by a combination of the LED sense resistor (RSL) 115, the LED current threshold voltage VIDL, and the current selection logic inputs ISET0 and ISET1 as set forth below in Table 2.

TABLE 2

LED current settings:

| ISET1 | ISET0 | ILED |
|---|---|---|
| 1 | 1 | 100% |
| 1 | 0 | 90% |
| 0 | 1 | 80% |
| 0 | 0 | 70% | where BLED at 100% is defined as:

ILEDMAX=VIDL/RSL

This selection allows binning of the LED current to provide color matching between modules.

The inner loop 200 establishes the average inductor current by controlling the peak switch current on a cycle-by-cycle basis. Since the relationship between peak current and average current is non-linear, depending on the duty cycle, the reference level for the peak switch current is modified by a slope generator 280, which reduces the peak switch current measurement by a small amount as the duty cycle increases. The slope generator 280 compensation also removes the instability inherent in a fixed frequency current control scheme.

In general, the control loops 200, 250 work as follows: the switch 110 current sensed by the current sense resistor RSS is compared to the LED current error signal. As the LED current increases the output of the error amplifier (AE) 256 will decrease, reducing the peak switch current and thus the current delivered to the LEDs 104. As the LED current decreases the output of the error amplifier (AE) 256 increases, increasing the peak switch current and thus increasing the current delivered to the LEDs.

Under some conditions, especially when the LED current is set to a relatively low value, the energy required in the inductor 114 may result in the inductor current dropping to zero for part of each cycle. This is known as discontinuous mode operation and will result in some low frequency ripple. The average LED current will however remain regulated down to zero. In discontinuous mode, when the inductor current drops to zero, the voltage at the drain of the external MOSFET will ring due to the resonant LC circuit formed by the inductor and the switch and diode capacitance. This ringing is low frequency and is not harmful.

In an exemplary embodiment, the frequency of the main oscillator is controlled by a single external resistor ROSC (kΩ) between the OSC pin and the GND pin. The oscillator frequency is approximately: fOSC=2200−(20×ROSC) kHz. If the OSC pin is left open circuit the oscillator frequency will be set to approximately 1 MHz when FSEL is high or to approximately 250 kHz when FSEL is low in one particular embodiment.

The switch current is measured by the switch sense resistor RSS and the switch sense amplifier (AS) 202. The input limit VIDS of the sense amplifier (AS) 202 and the maximum switch current ISMAX define the maximum value of the sense resistor as: RSS=VIDS ISMAX. This defines the maximum measurable value of the switch (and inductor) current. The peak switch current will always be less than this, set by the control circuit, depending on the required load conditions.

Although the LED brightness is determined by the current, it may be better to control the brightness by switching the current with a pulse width modulated signal. This allows the LED brightness to be set with little effect on the LED color. In one embodiment, four discrete brightness levels are provided by an internal PWM generator and selected by the logic levels on the PWM0 and PWM1 inputs. Three of the brightness levels provide brightness binning while the third level is lower providing a level for dimming. An exemplary PWM brightness scheme is illustrated in Table 3 below.

TABLE 3

PWM Brightness Scheme

| PWM1 | PWM0 | D |
|---|---|---|
| 1 | 1 | 100% |
| 1 | 0 | 87.5% |
| 0 | 1 | 75% |
| 0 | 0 | 25% |

The frequency of the internal PWM signal is determined by the main oscillator frequency and the logic level on the FSEL input as:

fPWM=fosc/4096 when FSEL=1 fPWM=fosc/1024 when FSEL=0

The brightness level can also be controlled by a PWM signal applied to the EN input. The frequency of this signal should be greater than half the equivalent internal PWM frequency to avoid going into sleep mode.

External components should be selected to achieve successful application of the LED driver. Although the inductor 114, switching MOSFET 110 and output capacitor 116 are the primary elements in the illustrative embodiment, the specification of the rectifying diode and sense resistors RSS, RSL should also be considered. In one embodiment, the starting point for component selection is to define the maximum LED current, the voltage across the LEDs 104, and the input operating voltage range. This then allows the average inductor 114 current under worst case conditions to be calculated. The inductor 114 value is then selected based on the acceptable inductor ripple current. The amount of ripple current will then determine the maximum inductor current under worst-case conditions. From this current, the switch current sense resistor RSS can be calculated.

When selecting the switch current sense resistor RSS, neither the absolute value of the switch current nor the accuracy of the measurement is important since the regulator will continuously adjust the switch current, within a closed loop, to provide sufficient energy for the output. For maximum accuracy the switch sense resistor RSS value should be chosen to maximize the differential signal seen by the sense amplifier (AS) 202. The input limit of the sense amplifier, VIDS, and the maximum switch current, ISMAX therefore define the maximum value of the sense resistor as RSS=VIDS/ISMAX, where ISMAX is the maximum switch current and should be set above the maximum inductor current ILPK. This represents the maximum measurable value of the switch (and inductor) current, however, the peak switch current will always be less than this, set by the control circuit, depending on the required load conditions.

Since the switch current control is within a closed loop, it is possible to reduce the value of the sense resistor RSS to reduce its power dissipation. However this will reduce the accuracy of the regulated LED current.

In an exemplary embodiment, a logic-level n-channel MOSFET is used as the switch 110 for the DC-DC converter. The converter topology used is a buck-boost referenced to the positive supply. This means that the voltage at the drain of the MOSFET 110 will reach a voltage equal to the sum of the LED voltage and the supply voltage. Under load dump conditions up to 90V may be present on this node. The external MOSFET 110 should therefore be rated to greater than 100V. The peak switch current is defined by the maximum inductor current ILPK, however in most cases the MOSFET 110 will be chosen by selecting a low on-resistance, which usually results in a current rating of several times the required peak current. In addition to minimizing cost, the choice of MOSFET 110 should consider both the on-resistance and the total gate charge. The total gate charge will determine the average current required from the internal regulator and thus the power dissipation.

There are a variety of considerations when selecting the output capacitor 116. The capacitor value is limited by the maximum ripple voltage. In the illustrative switching topology used, the output capacitor 116 provides the LED current when the switch 110 is active. The capacitor 116 is then recharged each time the inductor 114 passes energy to the output. The ripple current on the output capacitor 116 will be equal to the peak inductor current. The value of the output capacitor 110 for the illustrated embodiment will typically be about 10 µF and it should be rated above the maximum voltage defined by the series output LEDs 104.

In general, when operating near, e.g., 80%, of the maximum current rating of the LEDs 104, the ripple current should be minimized to avoid exceeding the rated current level of the LEDs in the stack. Without the load capacitor 116, the LEDs 104 may see a pure square wave well above the rated value as the circuit is first energized. While the load capacitor 116 filters the current to minimize peaks, the current sensing element RSL sees an unfiltered square wave so that the filtering is separate from the current regulation loop. Thus, the capacitor 116 does not factor into the regulation scheme described above.

As noted above, the converter limits current even during start up and does not need to wait for the capacitor 116 to charge. In known configurations, the LEDs 104 may see the maximum current that can be generated by the inductor 114 until current flows though the LED stack 104. The illustrated embodiment avoids current spikes during circuit start up.

The inventive converter can be used in a variety of applications. For example, the converter can energize a stack (e.g., two to ten) of high current (e.g., in the order of 1 A) LEDs. It is understood that any practical number of LEDs having various current ratings can be used. The present embodiments use PWM or other modulation technique to set the brightness of the LEDs by controlling the duty cycle. That is, PWM provides a current level to generate the correct color for the diodes instead of simply 'turning down' the current. For example, at a PWM frequency of 200 Hz (5 ms period) with a desired duty cycle of 90% results in 4.5 ms of on time and 0.5 ms of off time, preferably with a square waveform.

The inventive converter embodiments overcome certain limitations of capacitors. Electrolytic capacitors have a limited ability to handle ripple currents due to a significant equivalent series resistance (ESR) component. Switching current into the electrolytic capacitor can result in unacceptable heating. For high current applications, such as 1 A LEDs, this can limit the use of electrolytic capacitors in conventional implementations. While ceramic capacitors can better handle ripple currents due to less heating than electrolytic capacitors, ceramic capacitors are available at limited capacitance values, i.e., in the order of 10 µF. The inventive converter eliminates this capacitor ripple current tradeoff required in conventional implementations.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A circuit, comprising;
    a capacitive element for coupling across a load element to be energized by a DC signal;
    a first sense element to monitor an instantaneous sum of currents through the load element and the capacitive element;
    a switching element to control current through the first sense element;
    a second sense element coupled to the switching element to sense current through the switching element;
    an energy storage element coupled to the switching element,
    a differential transconductance amplifier having inputs coupled across the first sense element, wherein an output of the transconductance amplifier contains DC and switching element switching information;
    a second capacitive element coupled to the output of the differential transconductance amplifier;
    a unidirectional current flow element allowing current flow to the load element; and
    a converter circuit to control the switching element;
    wherein the converter circuit regulates to the current level monitored across the first sense element, and wherein a converter regulation loop includes a dominant pole to average the current sensed through the first sense element,
    wherein the differential transconductance amplifier and the second capacitive element provide the active and reactive element for the dominant pole to average the current sensed through the first sense element.

2. The circuit according to claim 1, wherein the load element includes an LED stack.

3. The circuit according to claim 1, wherein the capacitive element contains a further impedance element coupled in series with the capacitive element.

4. The circuit according to claim 1, wherein the unidirectional current flow element includes a diode.

5. The circuit according to claim 1, wherein the energy storage element includes an inductor.

6. The circuit according to claim 5, wherein the inductor has a first end coupled to the switching element and a second end coupled to an input voltage signal.

7. The circuit according to claim 1, wherein the converter circuit comprises switch current terminals coupled across the second sense element.

8. The circuit according to claim 7, wherein the converter circuit further includes an inner loop coupled to the switch current terminals to control an average energy storage element current by a peak switch current on a cycle-by-cycle basis.

9. The circuit according to claim 1, further including a second capacitive element coupled in parallel with the first sense element to filter average the current detected by the first sense element.

10. A circuit, comprising:
an LED stack;
a capacitor coupled across the LED stack;
a first current sensing resistor coupled in series with the LED stack and the capacitor to detect an instantaneous sum of currents through the LED stack and the capacitor;
a blocking diode having an anode and a cathode, the cathode being coupled to the LED stack and the capacitor;
an inductor having a first end and a second end, the first end being coupled to the anode of the blocking diode and the second end being coupled to an input voltage signal;
a switching dement coupled to the inductor and blocking diode anode, wherein the switching element controls the current through the first current sensing resistor;
a second current sensing resistor coupled to the switching element; and a converter circuit to control the switching element;
wherein the converter regulates to the current level monitored across the first current sensing resistor,
wherein a differential transconductance amplifier having inputs coupled across the first current sensing resistor, wherein an output of the transconductance amplifier contains DC and switching element switching information;
wherein a second capacitive element coupled to the output of the differential transconductance amplifier, wherein the differential transconductance amplifier and second capacitive element provide an active and reactive element of the dominant pole to average the current sensed through the first sense element.

11. The circuit according to claim 10, wherein the converter circuit includes first and second terminals coupled across the first current sensing resistor;
third and fourth terminals coupled across the second current sensing resistor; and
a fifth terminal coupled to the switching element to control current to the LED stack.

12. The circuit according to claim 11, further including a sixth terminal to receive a modulation signal.

13. The circuit according to claim 12, further including an eighth terminal to receive a current level selection signal.

14. The circuit according to claim 11, further including an outer loop coupled to the first and second terminals and an inner loop coupled to the third and fourth terminals.

15. A method, comprising:
providing a load;
coupling an impedance element across the load;
coupling a first sense element to the load to monitor an instantaneous sum of currents through the load and the impedance element;
providing a switching element to control a current through the first sense element;
coupling a second sense element to the switching element to sense a current through the switching element;
coupling a unidirectional current flow element to the switching element to allow current flow to the load;
coupling a converter circuit to the switching element to control the switching element; and
coupling an energy storage element to switching element,
wherein a differential transconductance amplifier has inputs coupled across the first sense element, wherein an output of the transconductance amplifier contains DC and switching element switching information;
wherein a second capacitive element coupled to the output of the differential transconductance amplifier, wherein the differential transconductance amplifier and second capacitive element provide an active and reactive element of the dominant pole to average the current sensed through the first sense element.

16. The method according to claim 15, wherein a converter regulation loop includes a dominant pole to average the current sensed through the first element.

17. The method according to claim 15, wherein the converter circuit further includes an inner loop coupled to the switch current terminals to control an average inductor current by a peak switch current on a cycle-by-cycle basis.

18. The method according to claim 15, further including coupling a second capacitive element in parallel with the first sense element to filter average the current detected by the first sense element.

19. The circuit according to claim 1, wherein a return path from the load element is not coupled to ground.

20. The circuit according to claim 19, wherein the return path is coupled to a supply voltage.

21. The circuit according to claim 20, wherein the first sense element is coupled to the supply voltage.

22. The circuit according to claim 10, wherein the capacitive element does not interfere with stability of the regulation loop.

* * * * *

UNITED STATES PATENT AND TRADEMARK OFFICE
CERTIFICATE OF CORRECTION

PATENT NO.       : 7,649,325 B2                                    Page 1 of 1
APPLICATION NO. : 11/396566
DATED            : January 19, 2010
INVENTOR(S)      : McIntosh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 567 days.

Signed and Sealed this

Twenty-third Day of November, 2010

David J. Kappos
*Director of the United States Patent and Trademark Office*